United States Patent
Chang (10) Patent No.: US 8,974,124 B2
(45) Date of Patent: Mar. 10, 2015

(54) FIBER OPTIC CONNECTOR

(75) Inventor: Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 191 days.

(21) Appl. No.: 13/587,907

(22) Filed: Aug. 16, 2012

(65) Prior Publication Data
US 2014/0050446 A1     Feb. 20, 2014

(51) Int. Cl.
G02B 6/36 (2006.01)
(52) U.S. Cl.
USPC .............................................. 385/81; 385/78
(58) Field of Classification Search
USPC ..................................................... 385/78, 81
See application file for complete search history.

(56) References Cited

U.S. PATENT DOCUMENTS

| | | |
|---|---|---|
| 4,150,790 A | 4/1979 | Potter |
| 4,327,964 A * | 5/1982 | Haesly et al. ............... 385/78 |
| 4,762,388 A | 8/1988 | Tanaka et al. |
| 4,764,129 A | 8/1988 | Jones et al. |
| 4,840,451 A | 6/1989 | Sampson et al. |
| 4,872,736 A * | 10/1989 | Myers et al. ............... 385/60 |
| D323,143 S | 1/1992 | Ohkura et al. |
| 5,212,752 A | 5/1993 | Stephenson et al. |
| 5,317,663 A | 5/1994 | Beard et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,134,370 A | 10/2000 | Childers et al. |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

"Fiber Optic Connectors and Assemblies Catalog" 2009, Huber & Suhner Fiber Optics, Herisau, Switzerland, http://www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6IDVc_WYbr0QQ.

(Continued)

Primary Examiner — Jerry Blevins
(74) Attorney, Agent, or Firm — Pepper Hamilton LLP (57) ABSTRACT

A connector for a fiber optic cable is disclosed, as well as a housing therefor, wherein the housing is formed as a single unitary piece to simplify construction and assembly. A ferrule assembly may be configured in conjunction with the housing to provide a retentive coupling between the assembly and the housing upon insertion of the assembly into the housing.

23 Claims, 6 Drawing Sheets

(56) References Cited

U.S. PATENT DOCUMENTS

| | | |
|---|---|---|
| 6,247,849 B1 | 6/2001 | Liu |
| 6,461,054 B1 | 10/2002 | Iwase |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 * | 3/2005 | Baus et al. ............... 411/347 |
| 6,935,789 B2 * | 8/2005 | Gross et al. ............... 385/78 |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 * | 5/2008 | Zimmel et al. ............... 439/78 |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,408,815 B2 | 4/2013 | Lin et al. |
| 2003/0053787 A1 | 3/2003 | Lee |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0141817 A1 | 6/2005 | Yazaki et al. |
| 2006/0089049 A1 | 4/2006 | Sedor |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | Lin et al. |
| 2009/0028507 A1 | 1/2009 | Jones et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2010/0034502 A1 | 2/2010 | Lu et al. |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0189260 A1 | 7/2012 | Kowalczyk et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0183012 A1 | 7/2013 | Cabanne Lopez et al. |
| 2014/0023322 A1 | 1/2014 | Gniadek et al. |

FOREIGN PATENT DOCUMENTS

| | | |
|---|---|---|
| CN | 201383588 Y | 1/2010 |
| DE | 202006011910 U1 | 3/2007 |
| DE | 102006019335 A1 | 10/2007 |
| EP | 1074868 A1 | 7/2001 |
| EP | 1245980 A2 | 10/2002 |
| EP | 1566674 A1 | 8/2005 |
| JP | 2009/229545 A | 10/2009 |
| JP | 2009/276493 A | 11/2009 |
| TW | 200821653 | 5/2008 |
| WO | WO 01/79904 | 10/2001 |
| WO | WO 2008/112986 | 9/2008 |
| WO | WO 2009/135787 | 11/2009 |
| WO | WO 2010/024851 | 3/2010 |
| WO | WO 2012/162385 | 11/2012 |
| WO | WO 2013/052070 | 4/2013 |
| WO | WO 2014/028527 | 2/2014 |

OTHER PUBLICATIONS

"Fiber Optic Interconnect Solutions, Tactical Fiber Optic Connectors, Cables and Termini" 2006, Glenair, Inc., Glendale, California, http://www.mps-electronics.de/fileadmin/files/MPS-E/Produkte/Katalog/Glenair/KatalogGlenair-LWL1110.pdf.

"Fiber Optic Products Catalog" Nov. 2007, Tyco Electronics Corporation, Harrisburg, Pennsylvania, http://www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

\* cited by examiner

FIBER OPTIC CONNECTOR

BACKGROUND

The use of fiber optics for communications purposes continues to grow. Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit without interruption.

The connector or connectors, in joining fiber ends, for example, has, as its primary function, the maintenance of the ends in a butting relationship such that the core of one of the fibers is axially aligned with the core of the other fiber to maximize light transmissions from one fiber to the other. Another goal is to minimize back reflections. An alignment can be extremely difficult to achieve. A good connection (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects. These same considerations apply to arrangements where the fiber, terminated in a plug connector, is to be used with active or passive devices, such as, for example, computers or transceivers and the like.

There are numerous, different, connector designs in use for achieving low insertion loss and stability. In most of these designs, a pair of ferrules (one in each connector or one in the connector and one in the apparatus or device), each containing an optical fiber end, are butted together end to end and light travels across the junction. Zero insertion loss requires that the fibers in the ferrules be exactly aligned, a condition that, given the necessity of manufacturing tolerances and cost considerations, can be virtually impossible to achieve, except by fortuitous accident. As a consequence, most connectors are designed to achieve a useful, preferably predictable, degree of alignment.

Fiber optic connectors can be relatively expensive to produce as numerous parts are required, and each of the parts may require a separate manufacturing process. In addition, an attachment process must be done to connect the parts together. There remains a need for a less expensive connector that is able to also provide a necessary degree of alignment.

SUMMARY

Presently disclosed is a fiber optic connector which has a reduced number of parts to minimize assembly, and reduce costs associated with the connector.

In an embodiment, an optical fiber connector includes a housing having a first end for receiving an optical fiber, a second end opposite the first end, and a longitudinal passage extending from the first end to the second end, a ferrule assembly having a ferrule holder and ferrule, the ferrule assembly for being inserted into and disposed within the passage, and longitudinally movable within the passage, the ferrule assembly being configured for retaining an optical fiber therein, and at least one of the housing and the ferrule holder includes a portion for engaging the other of the housing and the ferrule holder for retaining the ferrule assembly within the passage.

In a further embodiment, the connector includes a resilient member for biasing the ferrule assembly towards the second end of the housing, and at least one of the housing and the ferrule holder includes a portion for engaging the other of the housing and the ferrule holder for retaining the ferrule assembly within the passage in opposition to the bias of the resilient member.

In another embodiment, the portion for engaging includes at least one integral projecting portion of the one of the housing and the ferrule holder, and the other of the housing and the ferrule holder includes at least one integral recessed portion for receiving and engaging with corresponding projecting portions.

In another embodiment, the housing is a one-piece unitary body.

In another embodiment, the connector further includes a resilient member for being disposed in the passage for biasing the ferrule assembly towards the second end of the housing. In addition, the ferrule holder has a first end for being disposed toward the first end of the housing, and a second end for retaining the ferrule adjacent the second end of the housing, and the ferrule holder includes at least first and second radial projections spaced apart from one another in a circumferential direction about the ferrule holder. The passage includes corresponding recessed portions extending radially outwardly from the passage for receiving and retaining the radial projections therein.

In another embodiment, the passage, adjacent the second end of the housing, defines a first internal dimension, and the recessed portions define a second internal dimension greater than the first internal dimension. In addition, the radial projections include flanges integral with the ferrule holder and extending radially outwardly adjacent the second end of the ferrule holder to define a first flange position. The flanges in the first flange position define a distance greater than the first internal dimension and corresponding substantially to the second internal dimension. The flanges are radially inwardly displaceable from the first flange position to a second flange position and have a resilience for returning to the first flange position from the second flange position, the flanges in the second flange position define a distance less than the first internal dimension for insertion of the ferrule holder into and along at least a portion of the passage. The flanges are configured for resiliently returning from the second flange position towards the first flange position within the passage upon insertion into the passage and encountering the recessed portions within the passage.

In another embodiment, the passage includes a first cylindrical passage portion adjacent the first end of the housing and a second cylindrical passage portion adjacent the second end of the housing. In addition, the first cylindrical passage portion includes a first cylindrical wall defining a first diameter, and the second cylindrical passage portion includes a second cylindrical wall defining a second diameter of the first internal dimension. The first diameter is less than the second diameter, and the passage includes a first spring seat extending radially outwardly from the first cylindrical wall to the second cylindrical wall. The ferrule holder includes a first body portion for being disposed in the first cylindrical passage portion and a second body portion for being disposed within the second cylindrical passage portion. The first body portion has a third diameter less than the first diameter, and the second body portion has a fourth diameter greater than the first and third diameters and less than the second diameter. The ferrule holder includes a second spring seat extending radially outwardly from the first body portion to the second body portion. The resilient member includes a spring for being disposed around the first body portion for engagement between the first spring seat and the second spring seat, and the second body portion includes a substantially cylindrical wall that includes the flanges.

In another embodiment, the first and second radial projections include first and second flanges spaced apart 180° from one another in a circumferential direction about the ferrule holder. In addition, the corresponding recessed portions include openings extending through the housing from the second cylindrical wall to an exterior of the housing, wherein the openings are defined by a perimetrical wall and at least a first portion of the perimetrical wall is disposed towards the second end of the housing. The ferrule holder is insertable into the passage in a first longitudinal direction to compress the spring between the first and second spring seats, and the spring is for biasing the ferrule holder in a second longitudinal direction opposite the first longitudinal direction. The first and second flanges are configured to be radially displaceable from the first flange position to the second flange position upon insertion into the passage in the first direction, and the first and second flanges are configured for engaging the first perimetrical wall portions upon movement of the ferrule holder within the passage in the second longitudinal direction under bias of the spring.

In another embodiment, the first and second flanges have a circumferential dimension, the corresponding recesses have a circumferential dimension, and the circumferential dimension of the flanges and the circumferential dimension of the corresponding recesses are configured with respect to one another for preventing rotation of the ferrule holder within the housing when the ferrule holder is inserted into the housing and the flanges are disposed in the recesses.

In another embodiment, the passage, adjacent the first end of the housing, defines a first internal dimension, and the recessed portions define a second internal dimension greater than the first internal dimension. In addition, the first end of the ferrule holder includes at least first and second axially extending arms spaced radially from one another, wherein each of the arms has a first end integral with the ferrule holder and a second end disposed axially away from the first end. The radial projections extends radially outwardly adjacent the second end, and the axial arms have a first position wherein the projections define an external dimension greater than the first internal dimension and corresponding substantially to the second internal dimension. The axially extending arms are radially inwardly displaceable from the first position to a second position and have a resilience for returning to the first position from the second position. The projections in the second arm position define a distance less than the first internal dimension for insertion of the first end of the ferrule holder into and along at least a portion of the passage, and the axially extending arms are configured for resiliently returning from the second position towards the first position within the passage upon insertion into the passage and the projections encountering the recessed portions.

In another embodiment, the passage includes a first cylindrical passage portion adjacent the first end of the housing and a second cylindrical passage portion adjacent the second end of the housing, wherein the first cylindrical passage portion includes a first cylindrical wall defining a first diameter of the first internal dimension, and the second cylindrical passage portion includes a second cylindrical wall defining a second diameter greater than the first diameter. The first diameter is less than the second diameter, and the passage includes a first spring seat extending radially outwardly from the first cylindrical wall to the second cylindrical wall. The ferrule holder includes a first body portion for being disposed in the first cylindrical passage portion and a second body portion for being disposed within the second cylindrical passage portion, wherein the first body portion has a third diameter which is less than the first diameter, and the second body portion has a fourth diameter greater than the first and third diameters and less than the second diameter. The ferrule holder includes a second spring seat extending radially outwardly from the first body portion to the second body portion, and the resilient member is a spring for being disposed around the first body portion for engagement between the first spring seat and the second spring seat.

In another embodiment, the at least first and second axially extending arms include first, second, third and fourth axially extending arms disposed at about 90° from an adjacent arm in a circumferential direction about the ferrule holder. In addition, the corresponding recessed portions include one of: an annular enlargement of the first cylindrical passage portion adjacent the first end of the housing, wherein the annular enlargement defines a ring-shaped surface disposed away from the first housing end towards the second end of the housing; and an end surface of the first housing end, wherein the end surface defining a ring-shaped surface. The first end of the ferrule holder is insertable into the passage in a first longitudinal direction to compress the spring between the first and second spring seats, and the spring is for biasing the ferrule holder in a second longitudinal direction opposite the first longitudinal direction. The first, second, third and fourth axially extending arms are configured to be radially displaceable from the first position to the second position upon insertion into the passage in the first direction. In addition, the projections of the first, second, third and fourth axially extending arms are configured for engaging the ring-shaped surface upon movement of the ferrule holder within the passage in the second longitudinal direction under bias of the spring.

In another embodiment, one of the ferrule holder and the housing includes an additional radial projection, and the other of the ferrule holder and the housing includes a longitudinal slot for receiving the additional radial projection therein upon insertion of the ferrule holder into the passage to prevent rotational movement of the ferrule body within the passage.

In another embodiment, the ferrule holder is insertable into the passage through the second end of the housing in a first longitudinal direction, and the housing includes a retainer for being inserted through at least a portion of the housing to block at least a portion of the passage to retain the ferrule holder in the passage after insertion of the ferrule holder into the passage through the second end of the housing.

In another embodiment, the connector further includes a resilient member for biasing the ferrule holder in the passage towards the second end of the housing; and the retainer is configured for retaining the ferrule holder in the passage in opposition to the biasing of the resilient member after insertion of the ferrule holder into the passage.

In another embodiment, the retainer is a U-shaped clip having a base portion with spaced apart legs extending from the base portion, and the housing includes a slot for receipt of the clip therein. In addition, the spaced apart legs are for being inserted into the slot with the ferrule of the ferrule assembly located therebetween, wherein the legs are then disposed for retaining the ferrule holder in the passage in opposition to the biasing of the resilient member.

In another embodiment, each leg of the clip has a tip portion disposed away from the base of the clip, wherein the tip portions have an outwardly disposed projection extending laterally away from the corresponding tip for engaging with corresponding recesses of the slot to retain the clip in the slot, and each projection has a laterally outward end disposed away from the corresponding tip portion.

In another embodiment, the spaced apart legs in a first position define a first distance between the laterally outward ends of the tip portions, and the legs are resiliently displaceable in a direction towards one another to a second position wherein the laterally outward ends of the tip portions are disposed a second distance from one another. The second distance is less than the first distance. In addition, the slot includes: an opening in a surface of the housing, a bottom spaced apart from the opening, and first and second ends spaced apart and defining a slot length; a depth dimension into the housing extending from the opening to the bottom of the slot and corresponding to a length of the clip from the base of the clip to the tip portion; and each slot end includes an outwardly disposed recess adjacent the bottom of the slot and defining an edge for engaging with the projection of the tip portion, wherein the slot has a first length dimension extending from the opening to the edge and corresponding to the second distance to displace the legs from the first position to the second position upon insertion of the clip into the slot. The slot has a second length dimension at the recesses corresponding to the second distance for return of the legs from the second position to the first position when the projections enter the recesses to engage the projections with the edges.

In another embodiment, the ferrule holder includes a first end for retaining the ferrule therein and a second end opposite the first end for being inserted into the passage through the second end of the housing, and an outer peripheral surface having a longitudinal slot disposed therein extending in a direction from the first end to the second end, and the clip includes a projection for engaging with the longitudinal slot of the ferrule holder for preventing rotation of the ferrule holder within the passage.

In another embodiment, the base and legs of the clip define a plane, and the clip base includes the projection, wherein the projection extends from the base in a direction transverse to the plane of the clip.

In an addition embodiment, a one-piece housing for an optical fiber connector is disclosed, wherein the connector has a ferrule assembly for being movably disposed within the housing under bias of a resilient member, and the housing includes a one-piece unitary body having a first end and a second end opposite the first end, a longitudinal passage extending from the first end to the second end for receipt of the ferrule assembly therein, and at least one of the body and the ferrule assembly includes a portion for engaging the other of the housing and the ferrule assembly for retaining the ferrule assembly within the passage in opposition to the bias of the resilient member.

In a further embodiment, the portion for engaging includes at least one integral projecting portion of the one of the housing and the ferrule holder, and the other of the housing and the ferrule holder includes at least one recessed portion for receiving and engaging with corresponding projecting portions.

In a further embodiment, the housing includes the at least one recessed portion disposed within the passage and extending radially outwardly from the passage for receiving and retaining radial projections of a ferrule holder therein.

DETAILED DESCRIPTION

Optical fibers are used in a wide variety of applications, including the telecommunications industry in which optical fibers are employed in a number of telephony and data transmission applications. The variety of applications in which optical fibers are used are continuing to increase, due, at least in part, to the extremely wide bandwidth and the low noise operation provided by optical fibers. For example, optical fibers no longer serve as merely a medium for long distance signal transmission, but are being increasingly routed directly to the home for computer and television transmissions. With the ever increasing and varied use of optical fibers, it is apparent that efficient and inexpensive methods of coupling optical fibers, such as to other optical fibers, or to various remote terminals, is needed.

Figure 1A:
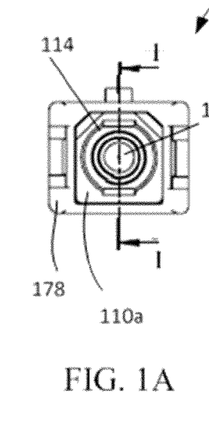
FIG. 1A-1C depict end, cross-sectional and expanded views of a fiber optic connector assembly according to an embodiment.
Figure 1B:
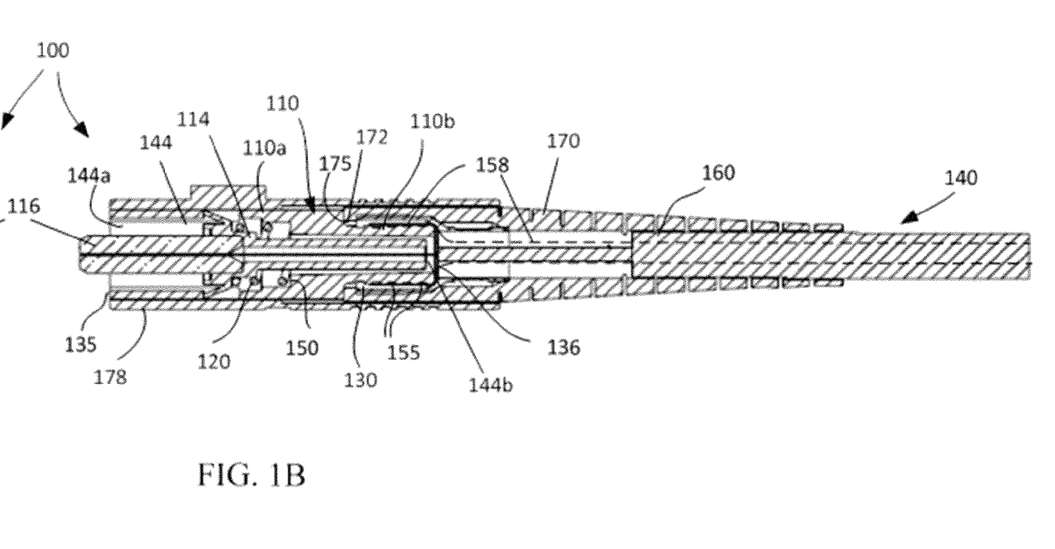
Figure 1C:
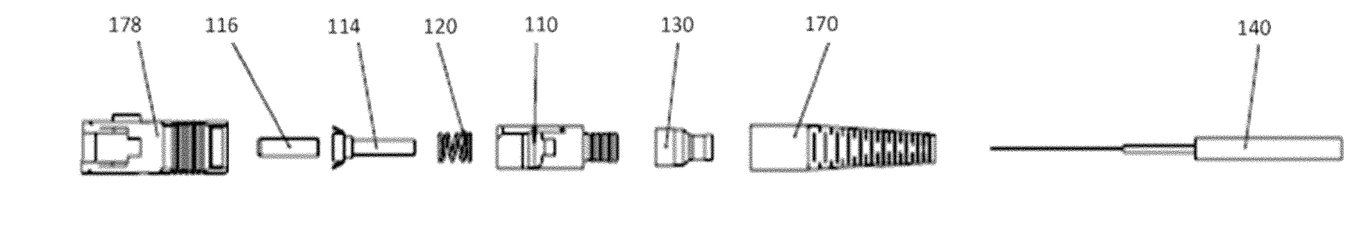

One type of connector in accordance with an embodiment of the invention is shown in FIGS. 1A-1C. While the figures generally relate to SC-type connectors, all of the aspects presented herein may also apply to LC-type connectors and other types of connectors as well. A connector 100 may have a single-piece housing 110, a ferrule holder 114, a ferrule 116, and a resilient member 120. The housing 110 may generally be viewed as having two housing parts, a main housing body 110a, and a housing tailpiece 110b. In an embodiment, and as discussed in more detail below, the housing 110 may be formed in a single integral piece.

The housing 110 has a first end 135, which may be the connection end, and a second end 136, which may be the cable receiving end for receiving a fiber optic cable 140. The housing also includes a passage 144 extending between the first end 135 and second end 136 with a first passage portion 144a disposed towards the first end and a second passage portion 144b disposed towards the second end. The ferrule holder 114, ferrule 116 and resilient member 120 may be positioned in the passage for longitudinal displacement therewithin. The housing passage 144 may have a shoulder 150 located at an intermediate position within the passage. The shoulder 150 may provide a seat for seating and positioning the spring element 120 within the passage 144. Resilient member 120 may be a coil spring, as shown, or may be any type of biasing device which is capable of instilling a biasing force to bias the ferrule holder 114 and ferrule 116 in a direction towards the first end 135.

Housing tailpiece 110b extends rearward from housing body 110 and terminates at the housing second end 136. Housing tailpiece 110b may further include surface gripping features, such as grooves 155, for retaining strength members 158 of the optical cable 140. The strength members 158 may be arimid yarns, such as Kevlar®, in a layer beneath the cable jacket 160 of the cable 140. If the connector 100 is to be attached to an optical fiber cable 140 having strength members 158, the strength members may be exposed by removing a portion of the cable jacket 160. The strength members 158 may then be placed over the gripping features 155 of housing tailpiece 100b and a clamping element, such as a crimp ring 130, may be crimped about the housing tailpiece, thereby capturing the strength members between the tailpiece and the clamping element. The gripping features 155 effectively increase the surface area of the tailpiece 110b beneath the clamping element 130, and aid in attaching the strength members 158 to housing 110. Although the gripping features in FIG. 1 are depicted as grooves 155, the gripping features may be other surface features such as, for example, ridges or dimples.

A boot 170 may be mounted on housing 110 in a manner which encircles the tailpiece 110b and crimp ring 130. The boot 170 may have a projecting lip 172 which fits into a groove 175 formed between the crimp ring 130 and the housing body 100a. A sleeve 178 may be disposed about the housing 110 and boot 170 to retain the lip 172 of the boot in the notch 175 and prevent the boot from moving off of the tailpiece 110b. Other complementary mating features and components may also be used for retaining the boot 170 on the housing 110, such as, for example, an additional crimping ring similar to the ring 130.

Figure 2:
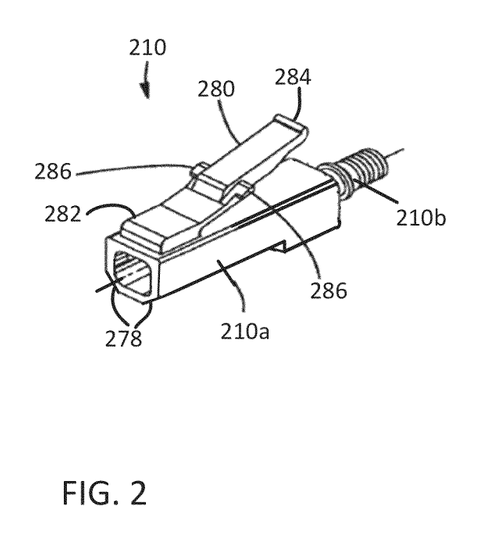
FIG. 2 depicts a connector housing according to an embodiment.

Depending on the final desired usage of the connector 100, a housing 210 may include additional features such as keying features, which may be chamfered corners 278 as depicted in FIG. 2, or a latching mechanism, such as a latching arm 280 for retaining the connector in its receiving component once inserted therein. In general, a latching arm 280 may include an attachment end 282 attached to housing body 210a and a cantilevered distal end 284 projecting away from the housing body. The latching arm 280 may also include latching lugs 286 for securing the housing 210 within an adapter for mating the connector to another connector, or to a fiber optic module. Latching arm 280 may be sufficiently resilient to allow the latching arm to be depressed, thereby deflecting distal end 284 toward housing body 210a. Such a latching arm may also be integrally molded with the housing 210 to maintain an integral one-piece housing component. The depicted latching arm is meant as an example only, and other configurations of latching arms may also be provided.

In an embodiment, the housing 110 may be formed in a single piece, for example, by injection molding. Materials for use in construction of the housing 110 may include various polymers, plastics, metals, glass, and other similar suitable materials. As an example, the housing 110 may be manufactured via a plastic injection molding process. Alternatively, the housing 110 may be manufactured from a suitable metal or other solid material via a milling process. Additional materials and manufacturing methods may also be used. By forming a housing as a single piece, the cost of the housing may be reduced by eliminating parts and assembly steps.

Figure 3A:
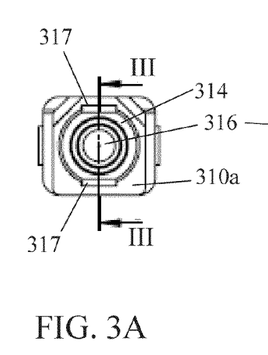
FIGS. 3A-3C depict end, cross-sectional and expanded views of a one-piece connector housing according to an embodiment.
Figure 3B:
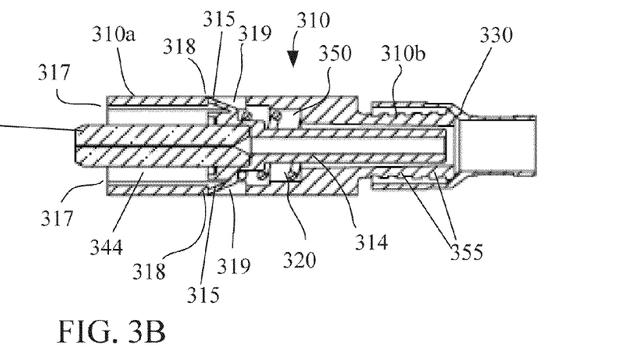
Figure 3C:
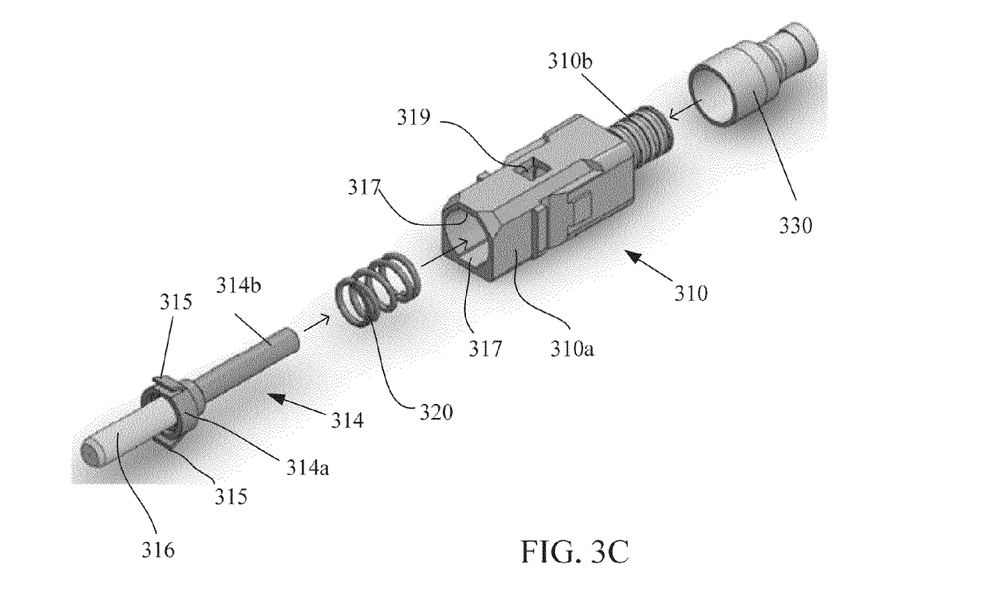

FIGS. 3A-3C depict an embodiment of a housing 310 which may be used in the connector 100 of FIGS. 1A-1C. A one-piece housing 310 may have a main body section 310A and a tailpiece section 310b. A longitudinal passage 344 is disposed within the housing for receipt of a resilient member, such as spring 320, and ferrule assembly (ferrule 316 and ferrule holder 314) therein. The ferrule assembly is longitudinally movable within the passage 344. Within the passage 344 there may be a seat 350 to provide a surface against which the resilient member 320 can press to provide a bias to the ferrule holder 314 to bias the ferrule 316 outwardly. In an assembled configuration as shown in FIG. 3B, the resilient member 320 may be in a compressed state to provide the bias for the ferrule 314.

For assembly, the resilient member 320 may be inserted into the passage 344, followed by the ferrule assembly. Or alternatively, the resilient member 320 may be inserted over the ferrule holder end 314b, and the resilient member and ferrule assembly may be inserted simultaneously into the passage 344. The ferrule holder 314 may be formed with integral protruding extensions 315 that extend radially from the holder head 314a. The housing body 310 may have corresponding guide grooves 317 for receipt of the extension 315 therein during insertion of the holder 314 into the passage 344. The guide grooves may terminate at openings 319. The extensions 315 may be resiliently compressible in a radially inward direction to allow the holder 314 to be inserted into the passage 344.

Holder 314 is movable longitudinally into the passage 344 with minimal resistance until the resilient member 320 is engaged between the seat 350 and the head portion 314a of the holder 314. At this engagement location, the extensions 315 will be pressed radially inwardly within the passage 344. By applying a pressure to force the ferrule assembly further into the passage 344, the resilient member 320 will compress allowing holder 314 to move further into the passage wherein the extensions 315 will move into the openings 319 and return radially outwardly to their original, non-compressed, configuration. The applied pressure to move the ferrule assembly further into the passage may then be released, and with the extensions 315 disposed in the openings 319 as shown in FIG. 3B, the leading edge of the extensions will engage the forward edge 318 of the openings to thereby retain the holder 314 within the passage 344 against the pressure of the resilient member 320. Extensions 315, along with guide grooves 317 and openings 319 may be configured to prevent, or at least minimize rotation of the holder 314, and attached ferrule 316, within the housing 310.

In an alternative configuration, openings 319 may be indentations in the circumferential wall of the passage 344 and may not extend completely from the passage through the housing. Further, while two extensions 315, two grooves 317 and two openings 319 are shown at a 180° offset, additional embodiments may include more than two extensions with corresponding grooves and openings (or indentations). For example, possibly three extensions 315 with corresponding indentations 319 at about 120° offsets, or four extensions with corresponding indentations/openings at about 90° offsets. An embodiment may also not include guide grooves 317, wherein the circumferential wall of the passage 344 may radially compress the extensions 315 until the openings are reached.

Figure 4A:
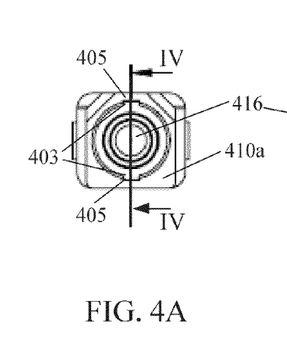
FIGS. 4A-4D depict end, cross-sectional and expanded views of a one-piece connector housing according to an embodiment.
Figure 4B:
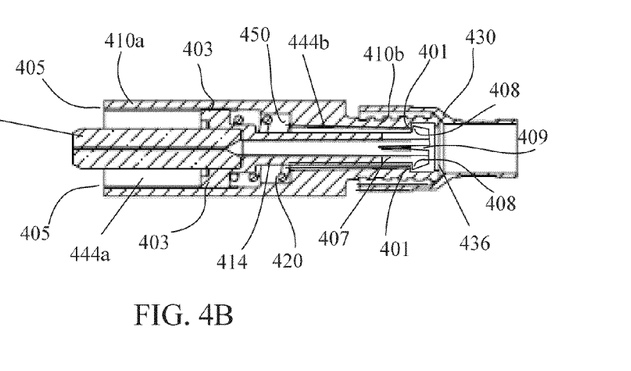

FIGS. 4A-4D illustrate an additional embodiment of a one-piece housing 410 which may be used in the connector 100 of FIGS. 1A-1C. Similar to the earlier embodiment of FIGS. 3A-3C, a one-piece housing 410 may have a main body section 410A and a tailpiece section 410b. A longitudinal passage 444, with a first passage portion 444a and a second passage portion 444b, is disposed within the housing 410 for receipt of a resilient member 420, such as a spring, and ferrule assembly (ferrule 416 and ferrule holder 414) therein. The ferrule assembly is longitudinally movable within the passage 444. Within the passage 444 there may be a seat 450 to provide a surface against which the resilient member 420 can press to provide a bias to the ferrule holder 414 to bias the ferrule 416 outwardly. In an assembled configuration as shown in FIG. 4B, the resilient member 420 may be in a compressed state to provide the bias for the ferrule 414.

For assembly, the resilient member 420 may be inserted into the passage 444, followed by the ferrule assembly. Or alternatively, the resilient member 420 may be inserted over the ferrule holder 414, and the resilient member and ferrule assembly may be inserted simultaneously into the passage 444. The ferrule holder 414 may be formed with integral protruding guide members 403 that extend radially from the holder head portion 414a. The housing body 410 may have corresponding guide grooves 405 for receipt of the guides 403 therein during insertion of the holder 414 into the passage 444.

In addition, the end 414b of the ferrule holder 414 may include radially displaceable flanges 407 which may be forced radially inwardly, but which have a resiliency to return to their non-compressed, natural state. The flanges 407 may include a protruding edge 408 which will define a larger diameter than a diameter of the tubular portion forming the end 414b. The passage portion 444b may be configured to have a diameter that is greater than the diameter of the tubular portion of the end 414b but less than the diameter at the edges 408. Upon insertion of the end 414b into the passage portion 444b the flanges 407 will be radially inwardly diverted to reduce the diameter the edges 408 to allow the holder end 414b to be inserted through the passage portion 444b.

Holder 414 will be movable longitudinally into the passage 444 with minimal resistance until the resilient member 420 is engaged between the seat 450 and the head portion 414a of the holder 414. At this engagement location, the flanges 407 will be pressed radially inwardly within the passage 444b. By applying additional pressure to force the ferrule assembly further into the passage 444, the resilient member 420 will compress allowing holder 414 to move further into the passage wherein the ridges 408 will move past the edges 401 in the housing tail portion 410b, at which point the diameter of the passage 444b increases, allowing the flanges 407 to return radially outwardly to their original, non-compressed, configuration. The applied pressure to move the ferrule assembly further into the passage may then be released, and with the ridges 408 disposed beyond the edges 401 as shown in FIG. 4B, the ridges 408 will engage the edge 401 to thereby retain the holder 414 within the passage 444 against the pressure of the resilient member 420. Guides 403, along with guide grooves 405 may be configured to prevent, or at least minimize rotation of the holder 414, and attached ferrule 416, within the housing 410.

Figures 4C, 4D:
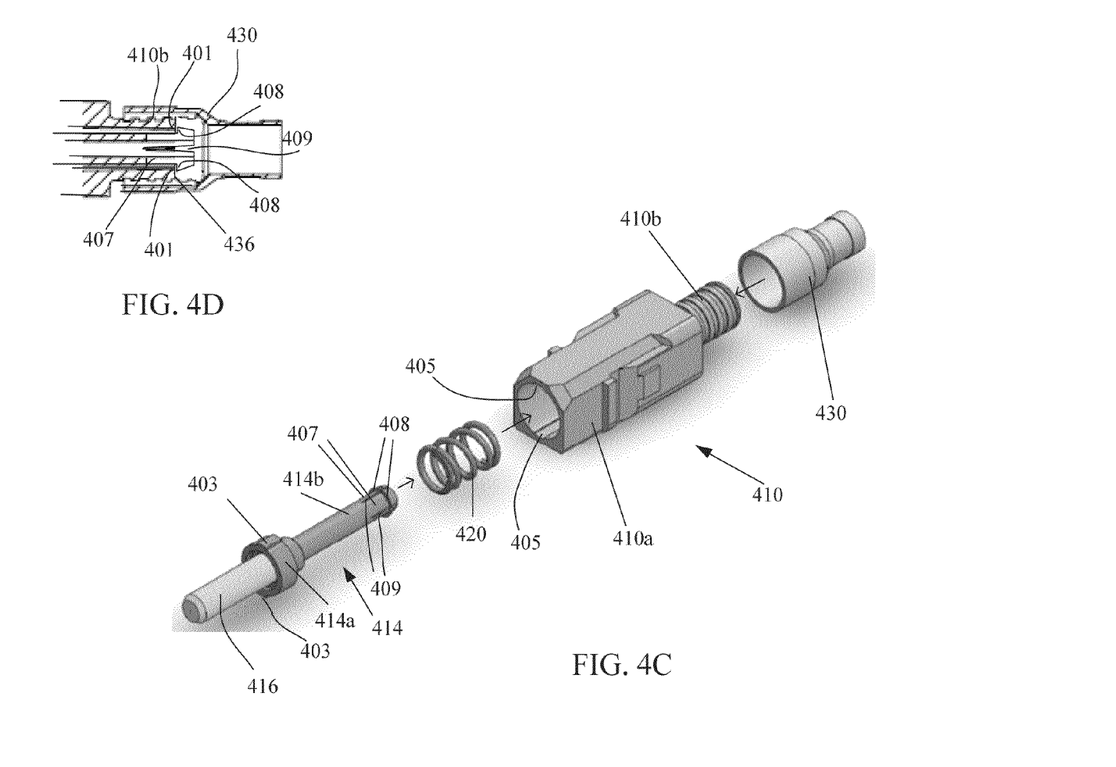

In an alternative configuration, as depicted in FIG. 4D, edges 401 in the circumferential wall of the passage 444b may be formed by the end 436 of the housing tail piece 410b. Further, while four flanges 407 are shown separated by dividing slots 409, larger spaces may define the dividing slots, and additional embodiments may possibly include only two or three flanges, or alternatively, more than four flanges. In an embodiment similar to that of FIGS. 4A-4C, possibly only two opposing ones of the flanges 407 may be present, and there may only be space therebetween (the space which is shown in FIGS. 4A-4C as occupied by the other two opposing flanges). An additional embodiment may also not include guide grooves 405 and projections 403, but may have an alternative arrangement for substantially preventing rotation of the ferrule holder 414 in the housing 410. Such an arrangement, for example, may be a pin-shaped projection of the inner wall in the tail piece 410b which engages in a slot 409.

Figure 5A:
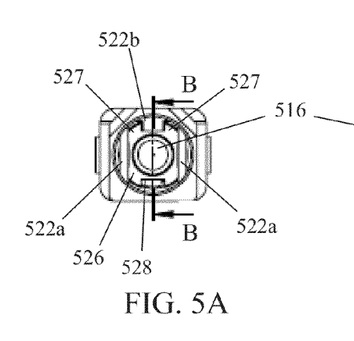
FIGS. 5A-5D depict end, cross-sectional and expanded views of a one-piece connector housing according to an embodiment.
Figure 5B:
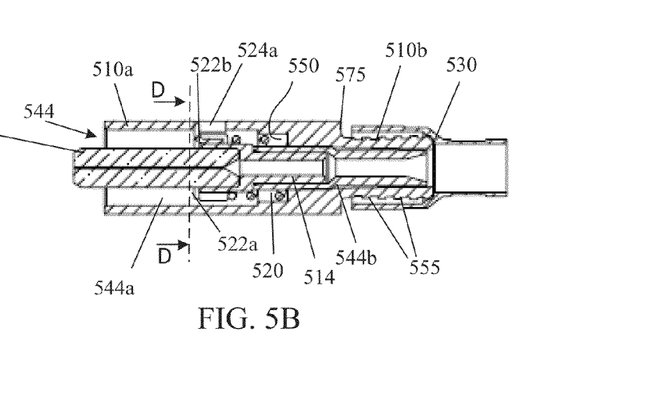
Figures 5C, 5D:
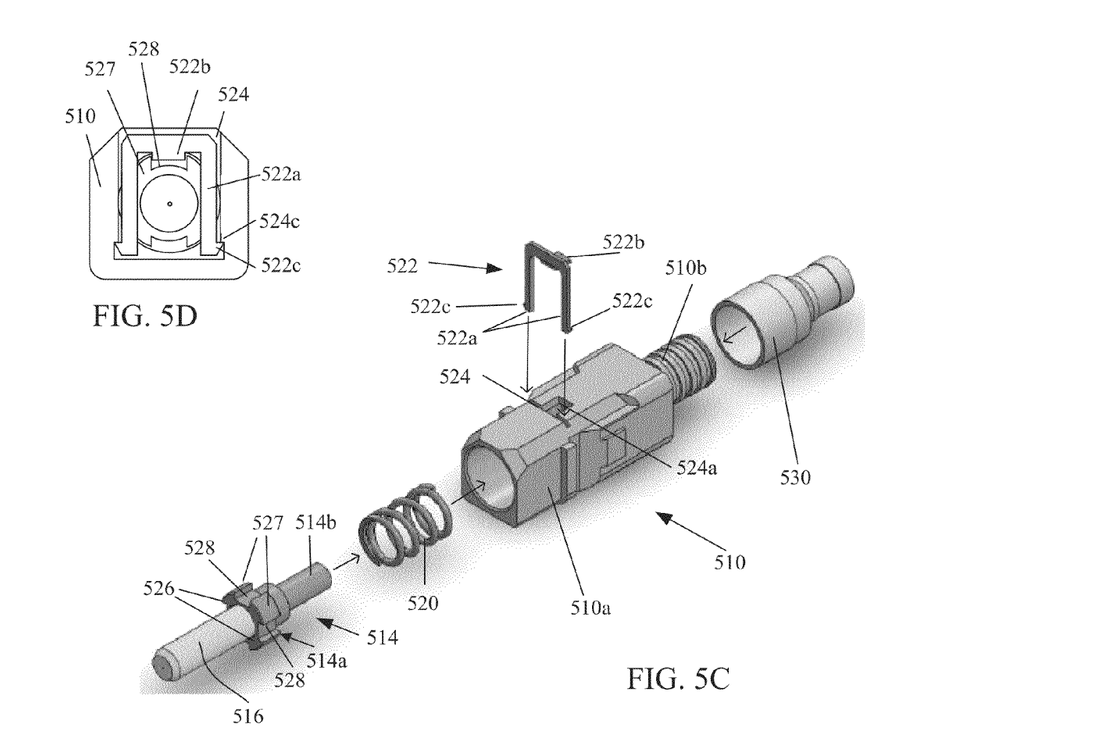

FIGS. 5A-5C illustrate an additional embodiment of a one-piece housing 510 which may be used in the connector 100 of FIGS. 1A-1C. Similar to the earlier embodiments, a one-piece housing 510 may have a main body section 510A and a tailpiece section 510b. A longitudinal passage 544, with a first passage portion 544a and a second passage portion 544b, is disposed within the housing 510 for receipt of a resilient member 520, such as a spring, and ferrule assembly (ferrule 516 and ferrule holder 514) therein. The ferrule assembly is longitudinally movable within the passage 544. Within the passage 544 there may be a seat 550 to provide a surface against which the resilient member 520 can press to provide a bias to the ferrule holder 514 to bias the ferrule 516 outwardly. In an assembled configuration as shown in FIG. 5B, the resilient member 520 may be in a compressed state to provide the bias for the ferrule 514.

For assembly, the resilient member 520 may be inserted into the passage 544, followed by the ferrule assembly. Or alternatively, the resilient member 520 may be inserted over the ferrule holder end 514b, and the resilient member and ferrule assembly may be inserted simultaneously into the passage 544. The head 514a of the ferrule holder 514 may be formed with integral protruding guide members 527 that extend radially from the head portion and which are separated by depressions 528. The outer diameter at the members 527 may correspond to the inner diameter of the passage portion 544a for radially centering the ferrule in the passage 544.

Holder 514 will be movable longitudinally into the passage 544 with minimal resistance until the resilient member 520 is engaged between the seat 550 and the head portion 514a of the holder 514. At this position, the front face 526 will not have yet been pushed past the slot 524. By applying additional pressure to force the ferrule assembly further into the passage 544, the resilient member 520 will compress, allowing holder 514 to move further into the passage wherein the face 526 will be moved past the slot 524. A clip 522 may then be inserted into the slot 524 to block at least a portion of the passage 544 to hold the ferrule holder 514 within the passage. The applied pressure to move the ferrule assembly further into the passage may then be released, and with the clip 522 disposed in the slot 524 as shown in FIG. 5B, the front face 526 of the ferrule head portion 514a will engage the clip to thereby retain the holder 514 within the passage 544 against the pressure of the resilient member 520.

As shown in FIGS. 5A and 5B, to prevent, or minimize rotation of the ferrule assembly 514 and attached ferrule 516 within the housing 510, the clip 522 may have a protruding tab 522b which extends into and engages in a depression 528 between two of the guides 527. Alternatively, the internal wall of the passage 544 may include at least one projection which extends into at least one of the depressions 528.

In an embodiment as depicted in FIGS. 5C and 5D, the clip 522 may be substantially U-shaped with two projecting legs 522a which are spaced apart a sufficient distance to permit the ferrule 516 to fit therebetween as shown in greater detail in FIG. 5D. The ends of the legs 522a may be configured with a projecting edge 522c that is configured for engaging with a ledge 524c in the slot 524 to thereby retain the clip in the slot. Upon insertion of the clip 522 into the slot 524 the legs 522a deflect slightly inwardly towards one another until the clip is fully inserted into the slot as shown in FIG. 5D, wherein the legs may return to their natural position with the edges 522c engaged with the ledges 524c. Because of the configuration of the projecting guide members 527 and depressions 528, if the ferrule holder 514 is not aligned correctly for receipt of the tab 522b into a depression 528 the tab will contact the guide member 527 and the clip will not be able to be inserted fully into the slot 524 for engagement of the edges 522c with the ledges 524c.

Alternate embodiments of clip/retaining configurations and rotation prevention configurations may also be provided for such a housing. For example, a housing may be configured for receipt of two individual pins which may be used in place of the legs 522a of the clip 522. In addition, various embodiments as presented herein may be used in combination with others of the embodiment. For example, the extensions 315 of FIGS. 3a-3c may be used in conjunction with the flanges 407 of FIGS. 4a-4c whereby if one part were to possibly malfunction a second retention mechanism would still be in place to retain the ferrule assembly in the housing.

Figure 6A:
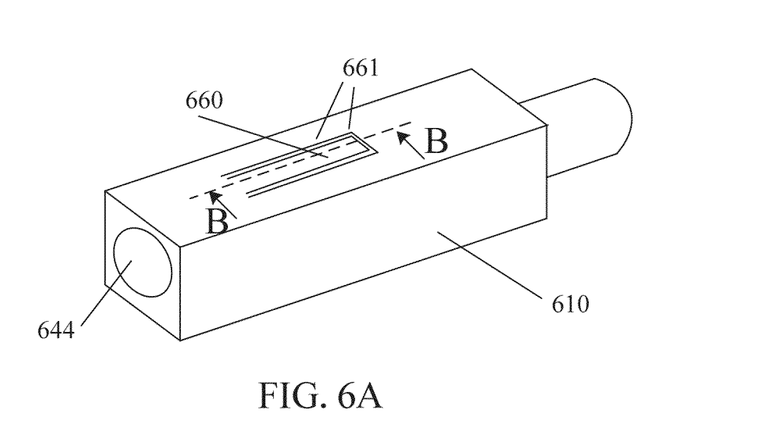
FIGS. 6A-6B depict an alternate configuration of a one-piece connector housing according to an embodiment.
Figure 6B:
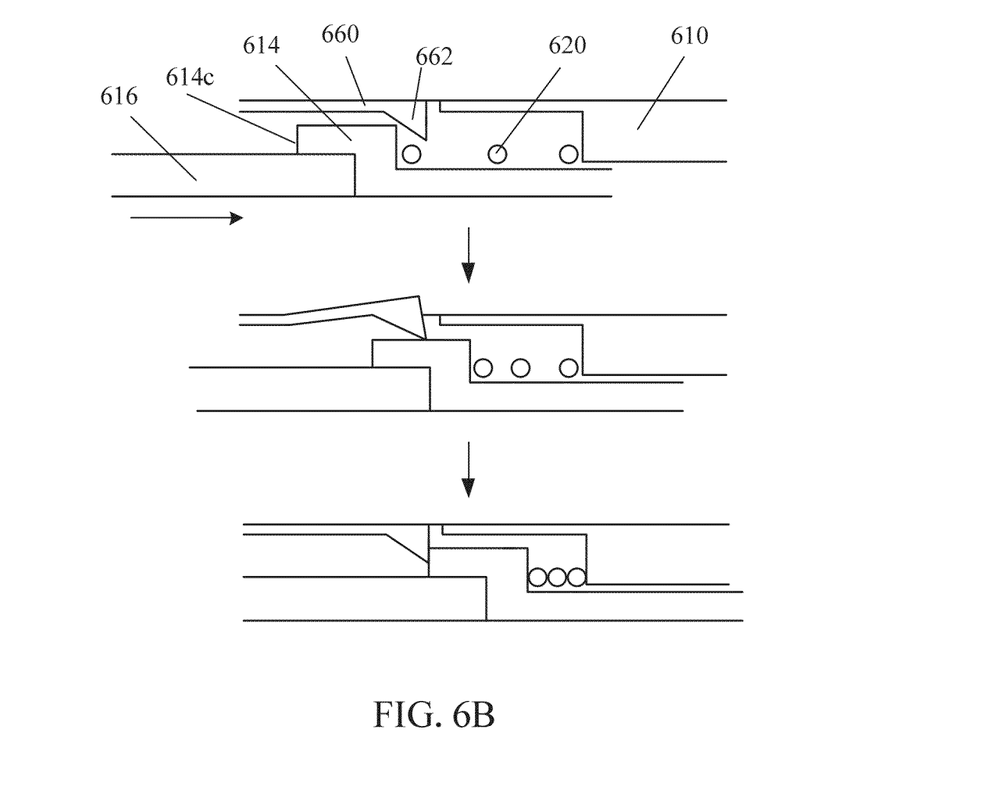

In a further embodiment as schematically depicted in FIGS. 6A and 6B, instead of the ferrule holder having a portion which is displaceable radially inwardly by the housing upon insertion into the housing, a housing 610 may have opposing wall portions 660 (one shown) which are displaceable radially outwardly upon insertion of a ferrule holder 614 into the housing. The housing wall portion 660 may be defined by slits 661 and being separated from the main housing portion, may be deflectable outwardly to allow the ferrule holder 614 to pass through the opening 644. The wall portion 660 will have a resiliency to return to its original location once the ferrule holder 614 has passed as represented schematically in FIG. 6, so that a projection 662 on the inside of the wall portion will then engage the edge 614c of the ferrule holder and hold the ferrule assembly in the housing 610 against the pressure of the resilient member 620. As in others of the embodiment, a configuration may also be provided to prevent rotation, such a key and slot configuration (403, 405) is shown in FIG. 4C.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber connector comprising:
a housing having a first end for receiving an optical fiber, a second end opposite the first end, and a longitudinal passage extending from the first end to the second end;
a ferrule assembly comprising a ferrule holder and ferrule, wherein the ferrule assembly and the second end are configured for insertion of the ferrule assembly through the second end in a first longitudinal direction and into the longitudinal passage for being disposed within the passage and longitudinally movable within the passage, the ferrule assembly being configured for retaining an optical fiber therein; and
at least one of the housing and the ferrule holder comprising a portion for engaging the other of the housing and the ferrule holder for retaining the ferrule assembly within the passage in opposition to movement of the ferrule assembly within the passage in a second longitudinal direction opposite the first longitudinal direction.

2. The connector of claim 1, further comprising:
a resilient member for biasing the ferrule assembly towards the second end of the housing in the second longitudinal direction; and
the portion for engaging comprises a portion for engaging the other of the housing and the ferrule holder for retaining the ferrule assembly within the passage in opposition to the bias of the resilient member.

3. The connector of claim 1, wherein the portion for engaging comprises at least one integral projecting portion of the one of the housing and the ferrule holder, and the other of the housing and the ferrule holder comprises at least one integral recessed portion for receiving and engaging with the at least one projecting portion.

4. The connector of claim 1, wherein the housing comprises a one-piece unitary body.

5. The connector of claim 4, wherein:
the connector further comprises a resilient member for being disposed in the passage for biasing the ferrule assembly towards the second end of the housing in the second longitudinal direction;
the ferrule holder has a first end for being disposed toward the first end of the housing, and a second end for retaining the ferrule adjacent the second end of the housing;
the portion for engaging comprises:
at least first and second radial projections on the ferrule holder and spaced apart from one another in a circumferential direction about the ferrule holder; and
corresponding recessed portions within the housing and extending radially outwardly from the passage for receiving and retaining the radial projections therein.

6. The connector of claim 5, wherein:
the passage, adjacent the second end of the housing, defines a first internal dimension, and the recessed portions define a second internal dimension greater than the first internal dimension;
the radial projections comprise flanges integral with the ferrule holder and extending radially outwardly adjacent the second end of the ferrule holder to define a first flange position, the flanges in the first flange position define a distance greater than the first internal dimension and corresponding substantially to the second internal dimension;
the flanges are radially inwardly displaceable from the first flange position to a second flange position and have a resilience for returning to the first flange position from the second flange position, the flanges in the second flange position define a distance less than the first internal dimension for insertion of the ferrule holder into and along at least a portion of the passage; and
the flanges are configured for resiliently returning from the second flange position towards the first flange position within the passage upon insertion into the passage and encountering the recessed portions within the passage.

7. The connector of claim 6, wherein:
the passage comprises a first cylindrical passage portion adjacent the first end of the housing and a second cylindrical passage portion adjacent the second end of the housing, the first cylindrical passage portion comprises a first cylindrical wall defining a first diameter, the second cylindrical passage portion comprises a second cylindrical wall defining a second diameter of the first internal dimension, the first diameter being less than the second diameter, and the passage comprises a first spring seat extending radially outwardly from the first cylindrical wall to the second cylindrical wall;
the ferrule holder comprises a first body portion for being disposed in the first cylindrical passage portion and a second body portion for being disposed within the second cylindrical passage portion, the first body portion having a third diameter less than the first diameter, the second body portion having a fourth diameter greater than the first and third diameters and less than the second diameter, and the ferrule holder comprises a second spring seat extending radially outwardly from the first body portion to the second body portion;
the resilient member comprises a spring for being disposed around the first body portion for engagement between the first spring seat and the second spring seat; and
the second body portion comprises a substantially cylindrical wall comprising the flanges.

8. The connector of claim 7, wherein:
the first and second radial projections comprise first and second flanges spaced apart 180° from one another in a circumferential direction about the ferrule holder;
the corresponding recessed portions comprise openings extending through the housing from the second cylindrical wall to an exterior of the housing, the openings being defined by a perimetrical wall and at least a first portion of the perimetrical wall is disposed towards the second end of the housing;
the ferrule holder is insertable into the passage in a first longitudinal direction to compress the spring between the first and second spring seats, the spring being for biasing the ferrule holder in a second longitudinal direction opposite the first longitudinal direction;
the first and second flanges are configured to be radially displaceable from the first flange position to the second flange position upon insertion into the passage in the first direction; and
the first and second flanges are configured for engaging the first perimetrical wall portions upon movement of the ferrule holder within the passage in the second longitudinal direction under bias of the spring.

9. The connector of claim 8, wherein the first and second flanges have a circumferential dimension and the corresponding recesses have a circumferential dimension, and the circumferential dimension of the flanges and the circumferential dimension of the corresponding recesses are configured with respect to one another for preventing rotation of the ferrule holder within the housing when the ferrule holder is inserted into the housing and the flanges are disposed in the recesses.

10. The connector of claim 5, wherein:
the passage, adjacent the first end of the housing, defines a first internal dimension, and the recessed portions define a second internal dimension greater than the first internal dimension;
the first end of the ferrule holder comprises at least first and second axially extending arms spaced radially from one another, each of the arms having a first end integral with the ferrule holder and a second end disposed axially away from the first end, the radial projections extending radially outwardly adjacent the second end, and the axial arms having a first position wherein the projections define an external dimension greater than the first internal dimension and corresponding substantially to the second internal dimension;
the axially extending arms are radially inwardly displaceable from the first position to a second position and have a resilience for returning to the first position from the second position, the projections in the second arm position define a distance less than the first internal dimension for insertion of the first end of the ferrule holder into and along at least a portion of the passage; and
the axially extending arms are configured for resiliently returning from the second position towards the first position within the passage upon insertion into the passage and the projections encountering the recessed portions.

11. The connector of claim 10, wherein:
the passage comprises a first cylindrical passage portion adjacent the first end of the housing and a second cylindrical passage portion adjacent the second end of the housing, the first cylindrical passage portion comprises a first cylindrical wall defining a first diameter of the first internal dimension, the second cylindrical passage portion comprises a second cylindrical wall defining a second diameter greater than the first diameter, the first diameter being less than the second diameter, and the passage comprises a first spring seat extending radially outwardly from the first cylindrical wall to the second cylindrical wall;
the ferrule holder comprises a first body portion for being disposed in the first cylindrical passage portion and a second body portion for being disposed within the second cylindrical passage portion, the first body portion having a third diameter less than the first diameter, the second body portion having a fourth diameter greater than the first and third diameters and less than the second diameter, and the ferrule holder comprises a second spring seat extending radially outwardly from the first body portion to the second body portion; and
the resilient member comprises a spring for being disposed around the first body portion for engagement between the first spring seat and the second spring seat.

12. The connector of claim 11, wherein:
the at least first and second axially extending arms comprise first, second, third and fourth axially extending arms disposed at about 90° from an adjacent arm in a circumferential direction about the ferrule holder;
the corresponding recessed portions comprise one of:
an annular enlargement of the first cylindrical passage portion adjacent the first end of the housing, the annular enlargement defining a ring-shaped surface disposed away from the first housing end towards the second end of the housing; and
an end surface of the first housing end, the end surface defining a ring-shaped surface;
the first end of the ferrule holder is insertable into the passage in a first longitudinal direction to compress the spring between the first and second spring seats, the spring being for biasing the ferrule holder in a second longitudinal direction opposite the first longitudinal direction;
the first, second, third and fourth axially extending arms are configured to be radially displaceable from the first position to the second position upon insertion into the passage in the first direction; and
the projections of the first, second, third and fourth axially extending arms are configured for engaging the ring-shaped surface upon movement of the ferrule holder within the passage in the second longitudinal direction under bias of the spring.

13. The connector of claim 12, wherein one of the ferrule holder and the housing comprises an additional radial projection, and the other of the ferrule holder and the housing comprises a longitudinal slot for receiving the additional radial projection therein upon insertion of the ferrule holder into the passage to prevent rotational movement of the ferrule body within the passage.

14. An optical fiber connector comprising:
a housing having a first end for receiving an optical fiber, a second end opposite the first end, and a longitudinal passage extending from the first end to the second end;
a ferrule assembly comprising a ferrule holder and ferrule, the ferrule holder is insertable into the longitudinal passage through the second end of the housing in a first longitudinal direction for being disposed within the passage and longitudinally movable within the passage, the ferrule assembly being configured for retaining an optical fiber therein; and
the housing comprises a retainer for being inserted through at least a portion of the housing to block at least a portion of the passage to retain the ferrule holder in the passage after insertion of the ferrule holder into the passage through the second end of the housing.

15. The connector of claim 14, further comprising:
a resilient member for biasing the ferrule holder in the passage towards the second end of the housing; and
the retainer being configured for retaining the ferrule holder in the passage in opposition to the biasing of the resilient member after insertion of the ferrule holder into the passage.

16. The connector of claim 15, wherein:
the retainer comprises a U-shaped clip having a base portion with spaced apart legs extending from the base portion;
the housing comprises a slot for receipt of the clip therein; and
the spaced apart legs for being inserted into the slot with the ferrule of the ferrule assembly located therebetween, the legs being disposed for retaining the ferrule holder in the passage in opposition to the biasing of the resilient member.

17. The connector of claim 16, wherein each leg of the clip has a tip portion disposed away from the base of the clip, the tip portions having an outwardly disposed projection extending laterally away from the corresponding tip for engaging with corresponding recesses of the slot to retain the clip in the slot, and each projection having a laterally outward end disposed away from the corresponding tip potion.

18. The connector of claim 17, wherein:
the spaced apart legs in a first position define a first distance between the laterally outward ends of the tip portions, and the legs are resiliently displaceable in a direction towards one another to a second position wherein the laterally outward ends of the tip portions are disposed a second distance from one another, the second distance being less than the first distance; and
the slot comprises:
an opening in a surface of the housing, a bottom spaced apart from the opening, and first and second ends spaced apart and defining a slot length;
a depth dimension into the housing extending from the opening to the bottom of the slot and corresponding to a length of the clip from the base of the clip to the tip portion; and
each slot end comprises an outwardly disposed recess adjacent the bottom of the slot and defining an edge for engaging with the projection of the tip portion, wherein the slot has a first length dimension extending from the opening to the edge and corresponding to the second distance to displace the legs from the first position to the second position upon insertion of the clip into the slot, and the slot has a second length dimension at the recesses corresponding to the second distance for return of the legs from the second position to the first position when the projections enter the recesses to engage the projections with the edges.

19. The connector of claim 18, wherein:
the ferrule holder comprises:
a first end for retaining the ferrule therein and a second end opposite the first end for being inserted into the passage through the second end of the housing; and
an outer peripheral surface having a longitudinal slot disposed therein extending in a direction from the first end to the second end; and
the clip comprises a projection for engaging with the longitudinal slot of the ferrule holder for preventing rotation of the ferrule holder within the passage.

20. The connector of claim 19, wherein:
the base and legs of the clip define a plane;
the clip base comprises the projection; and
the projection extends from the base in a direction transverse to the plane of the clip.

21. A one-piece housing for an optical fiber connector, the connector having a ferrule assembly for being movably disposed within the housing under bias of a resilient member, and the housing comprising:
a one-piece unitary body having a first end for receiving an optical fiber, a second end opposite the first end, and a longitudinal passage extending from the first end to the second end for receipt of the ferrule assembly therein, wherein the second end is configured for passage of the ferrule assembly therethrough in a first longitudinal direction for insertion of the ferrule assembly into the longitudinal passage; and
at least one of the body and the ferrule assembly comprising a portion for engaging the other of the body and the ferrule assembly for preventing movement of the ferrule assembly out of the passage through the second end in a second longitudinal direction opposite the first longitudinal direction.

22. The housing of claim 21, wherein the portion for engaging comprises at least one integral projecting portion of the one of the housing and the ferrule holder, and the other of the housing and the ferrule holder comprises at least one corresponding recessed portion for receiving and engaging with the at least one integral projecting portion.

23. The housing of claim 22, wherein:
the ferrule holder comprises the at least one integral projecting portion as a radial projection extending radially outwardly from the ferrule holder; and
the housing comprises the at least one recessed portion disposed within the passage and extending radially outwardly from the passage for receiving and retaining the radial projection of the ferrule holder therein.

* * * * *